(12) United States Patent
Ishiguro

(10) Patent No.: US 6,648,971 B2  
(45) Date of Patent: Nov. 18, 2003

(54) JIG FOR WATERPROOFING CLEARANCES BETWEEN ELECTRIC WIRES

(75) Inventor: Shun Ishiguro, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 201 days.

(21) Appl. No.: 09/893,467

(22) Filed: Jun. 29, 2001

(65) Prior Publication Data

US 2002/0050390 A1 May 2, 2002

(30) Foreign Application Priority Data

Jul. 5, 2000 (JP) .......................... 2000-203458

(51) Int. Cl.⁷ .............................. B05C 13/02
(52) U.S. Cl. .................... 118/500; 174/110 R; 269/903
(58) Field of Search ................. 118/313, 316, 118/323, 325, 307, 405, 411, 412, 420, 428, 500, DIG. 18; 156/51, 578; 174/110 R; 269/903

(56) References Cited

U.S. PATENT DOCUMENTS

| | | | | |
|---|---|---|---|---|
| 4,013,435 A | * | 3/1977 | Kane et al. | .................... 65/500 |
| 4,220,114 A | * | 9/1980 | Radowicz | .................... 118/411 |
| 5,456,791 A | | 10/1995 | Ueno | .......................... 156/556 |
| 5,536,904 A | | 7/1996 | Kojima et al. | ............ 174/23 R |
| 5,635,678 A | | 6/1997 | Yasukuni | ................ 174/152 G |

* cited by examiner

Primary Examiner—Laura Edwards  
(74) Attorney, Agent, or Firm—Greenblum & Bernstein, P.L.C.

(57) ABSTRACT

A waterproofing jig is provided that includes a support body having parallel receiving chambers configured to contain electric wires in a juxtaposed manner. Nozzle holes are formed in the support body to eject a sealant into the receiving chambers. The waterproofing jig fills clearances between electric wires with a sealant within a small space and readily enhances waterproofing of the clearances.

8 Claims, 4 Drawing Sheets

Fig. 2(a)
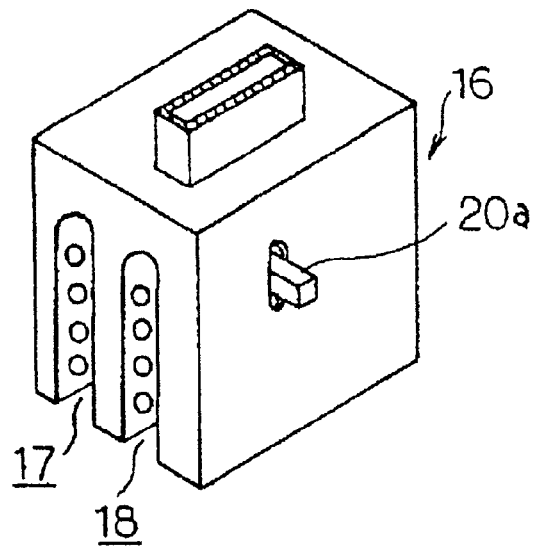
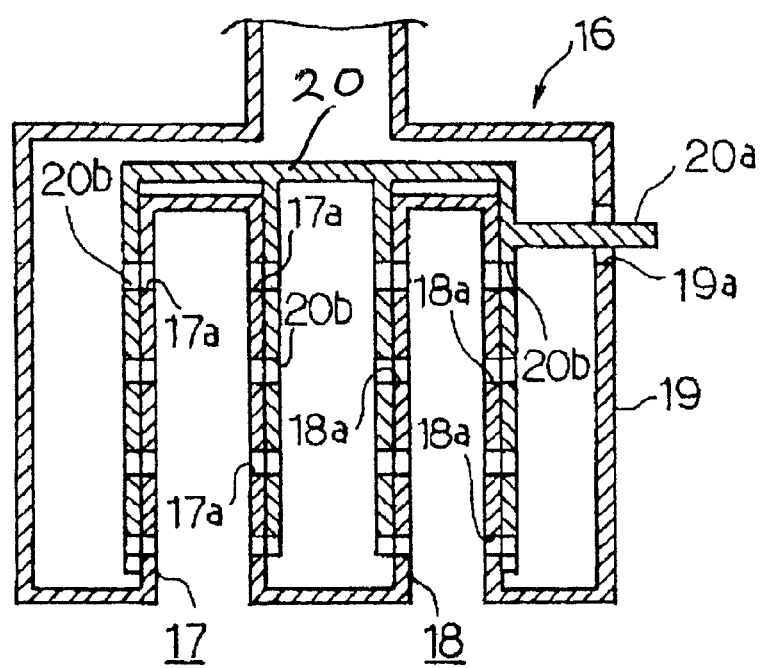
Fig. 2(b)

Fig. 3(a)
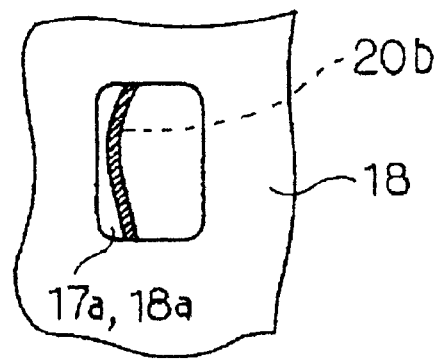
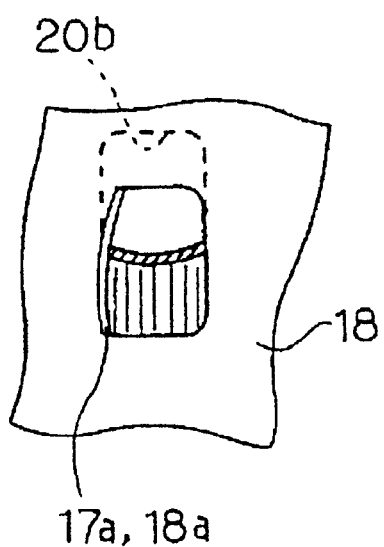
Fig. 3(b)

JIG FOR WATERPROOFING CLEARANCES BETWEEN ELECTRIC WIRES

BACKGROUND OF THE INVENTION

1. Field of the Invention

This invention relates to a jig for waterproofing clearances between electric wires and to a method for waterproofing clearances between electric wires, and more particularly relates to a jig for waterproofing clearances between electric wires and a method for waterproofing clearances between electric wires which can be applied to a wire harness composed by bundling a plurality of electric wires and can prevent water from entering an interior of a vehicle body panel through clearances between the electric wires from outside of the vehicle body panel by filling the clearances with a sealant.

2. Description of Background Information

In general, a wire harness which is installed in an automotive vehicle is formed by bundling a plurality of electric wires. A terminal provided on an end of each electric wire is connected to an electrical device such as an ECU, thereby electrically interconnecting the electrical devices.

In the case where such a wire harness is arranged from outside a vehicle body panel to an interior of the panel, water will enter the interior of the panel from an engine compartment or space through clearances between the electric wires forming a wire harness. This will result in operational errors in the ECU or the like. Accordingly, it is necessary to apply a waterproofing treatment to the clearances between electric wires.

For convenience of explanation, a prior waterproofing jig for clearances between electric wires will be described with reference to FIGS. 4(a) and 4(b). FIG. 4(a) is a perspective view of a conventional wire harness assembling jig. FIG. 4(b) is a front elevation view of the conventional waterproofing jig for clearances between electric wires.

Heretofore, a method shown in FIGS. 4(a) and 4(b) is known as one of waterproofing methods. In FIGS. 4(a) and 4(b), U-shaped jigs 1 and 2 extend upwardly from a wire harness assembling base (not shown). The U-shaped jig 1 has a wide width so as to hold electric wires 3 as a bundle while the U-shaped jig 2 has a great height to enable arrangement of the electric wires in a juxtaposed manner.

A waterproofing jig 4 for clearances between electric wires includes a U-shaped support body 6 having a single receiving chamber 5 in which the electric wires are received and arranged in a juxtaposed manner. The support body 6 is provided on opposed inner peripheral surfaces with a plurality of nozzle holes 4a through which a sealant such as an adhesive (not shown) is ejected into the receiving chamber 5. The support body 6 is connected to an adhesive-ejection tank (not shown).

In order to seal the clearances between the electric wires 3 by means of the support body 6, the support body 6 is positioned over clearances between the electric wires 3 which are arranged in a juxtaposed manner between the U-shaped jigs 2 so that the electric wires 3 are contained in the receiving chamber 5. An adhesive is ejected from the ejecting tank through nozzle holes 4a onto the electric wires 3 to fill the clearances between the electric wires 3 with the adhesive, and then the support body 6 is removed from the electric wires 3. Consequently, the adhesive can seal the clearances between the electric wires 3.

A waterproofing rubber compound may be provided in the clearances between the electric wires 3 arranged between the U-shaped jig 2 in a juxtaposed manner without using any waterproofing jig for clearances between electric wires, thereby filling up the clearances with the rubber compound.

However, in such a conventional waterproofing jig 4 for clearances between electric wires, the support body 6 has only one receiving chamber 5 which serves to contain the electric wires 3 in a juxtaposed manner. If a wire harness has a large size, it is necessary to arrange the electric wires juxtaposed in a vertical direction. This requires a higher working space in a vertical direction.

It is also necessary that the uppermost and lowermost electric wires juxtaposed in a vertical direction are longer than intermediate electric wires. This results in an excessive length for each of the uppermost and lowermost electric wires. The electric wires having excessive lengths must be cut off after filling the clearances between the electric wires 3 with the adhesive. This problem will occur in the case of fitting the waterproofing rubber into the clearances between the electric wires.

SUMMARY OF THE INVENTION

An object of the present invention is to provide a jig for waterproofing clearances between electric wires and a method for waterproofing clearances between electric wires which can fill clearances between electric wires with a sealant, by utilizing a small space, attain work readiness, and prevent the electric wires from resulting in an excessive length, thereby eliminating the necessity of post-treatment.

In order to overcome the above problems, an aspect of the present invention is to provide a jig for waterproofing clearances between electric wires, wherein a sealant is filled into clearances between a plurality of electric wires to waterproof the clearances between the electric wires. The waterproofing jig includes a support body having at least two receiving chambers, each receiving chamber being configured to receive a plurality of electric wires in a juxtaposed manner and a plurality of nozzle holes formed in the support body for ejecting the sealant into the chambers.

The sealant is ejected from the nozzle holes into the receiving chambers after containing a plurality of electric wires juxtaposed in each receiving chamber. Then, the electric wires are bundled after they are removed from the receiving chambers. Thus, it is possible to fill clearances between electric wires with a sealant, thereby waterproofing the clearances.

In the present invention, plural sets (on the contrary, only one set in the prior art) of juxtaposed electric wires are arranged in parallel to one another and the support body can inject the sealant into the clearances between the plural sets of the juxtaposed electric wires. Accordingly, the support body does not require a large amount of space in a vertical direction and can fill the clearances between the electric wires with the sealant within a small space and enhances readiness in waterproofing the clearances between the electric wires.

Since the juxtaposed electric wires are not arranged in a wide vertical area, it is possible to prevent the uppermost and lowermost electric wires from resulting in excessive lengths, thereby eliminating a step of treating the excessive lengths of the electric wires.

In order to overcome the above problems, another aspect of the invention is directed to a jig for waterproofing clearances between electric wires which further includes an adjusting member mounted on the support body for changing an opening area of the nozzle holes.

In another aspect of the present invention, a jig for waterproofing clearances between electric wires is provided that wherein the adjusting member includes at least one plate provided with holes corresponding to the nozzle holes. Additionally, the at least one plate may be slidable relative to the support body for changing the opening area of the nozzle holes, and an actuator for the at least one plate may be provided.

It is possible to adjust a quantity of a sealant to be injected into the receiving chambers and thus possible to inject a quantity of a sealant suitable for any number of electric wires.

In order to overcome the above problems, still another aspect of the invention is directed to a method for waterproofing clearances between electric wires which includes preparing a jig for waterproofing clearances between electric wires, wherein a sealant is filled into clearances between a plurality of electric wires to waterproof the clearances between the electric wires. The jig includes a support body having at least two receiving chambers, each receiving chamber being configured to receive a plurality of electric wires in a juxtaposed manner. A plurality of nozzle holes are formed in the support body for injecting the sealant into the chambers. The method further includes injecting the sealant from the nozzle holes after containing the electric wires in the receiving chambers, and bundling the electric wires after removing the electric wires from the receiving chambers.

In another aspect of the present invention, plural sets (on the contrary, only one set in the prior art) of juxtaposed electric wires are arranged in parallel to one another and the support body can inject the sealant into the clearances between the plural sets of the juxtaposed electric wires. Accordingly, the support body does not require a large amount of space in a vertical direction and can fill the clearances between the electric wires with the sealant within a small space and thus enhance readiness in waterproofing the clearances between the electric wires.

Since the juxtaposed electric wires are not arranged in a large vertical area, it is possible to prevent the uppermost and lowermost electric wires from resulting in excessive lengths, thereby eliminating a step of treating the excessive lengths of the electric wires.

In a further aspect of the present invention, a system is provided for waterproofing clearances between electric wire of a wire harness formed from a plurality of electric wires. The system includes a plurality of first generally U-shaped jigs mounted on a wiring board to extend upwardly therefrom, the first jigs configured to first and second ends of the wire harness. A plurality of second generally U-shaped jigs are mounted on the wiring board between the first jigs, the second jigs configured to retain a portion of the electric wires of the wire harness in a vertically spaced array. Additionally, a waterproofing jig is configured to be positioned over each portion of electric wires to inject a sealant into clearances between the electric wires.

According to another aspect of the present invention, the system may further include forming the waterproofing jig to include a support body including at least two receiving chambers, each receiving chamber configured to receive a respective portion of the electric wires, and the support body may include a plurality of nozzle holes communicating with the receiving chambers.

In a further aspect of the present invention, the system may include an adjusting member mounted on the support body for changing an opening area of the nozzle holes, and the adjusting member may include at least one plate provided with holes corresponding to the nozzle holes. The at least one plate may be slidable relative to the support body for changing the opening area of the nozzle holes, and an actuator for the at least one plate may be provided.

BRIEF DESCRIPTION OF THE DRAWINGS

The foregoing and other features of the present invention will become apparent to one skilled in the art to which the present invention relates upon consideration of the invention with reference to the accompanying drawings, wherein:

FIG. 2(a) is a schematic perspective view of an embodiment of a jig for waterproofing clearances between electric wires;

FIG. 2(b) is a cross section view of the waterproofing jig shown in FIG. 2(a);

FIG. 3(a) is a plan view of a nozzle hole in an embodiment of the present invention, illustrating an opening area of the nozzle hole being increased;

FIG. 3(b) is a plan view of a nozzle hole in an embodiment of the present invention, illustrating an opening area of the nozzle hole being decreased;

DETAILED DESCRIPTION OF THE PREFERRED EMBODIMENTS

Embodiments in accordance with the present invention will be described below with reference to the drawings.

Figure 1:
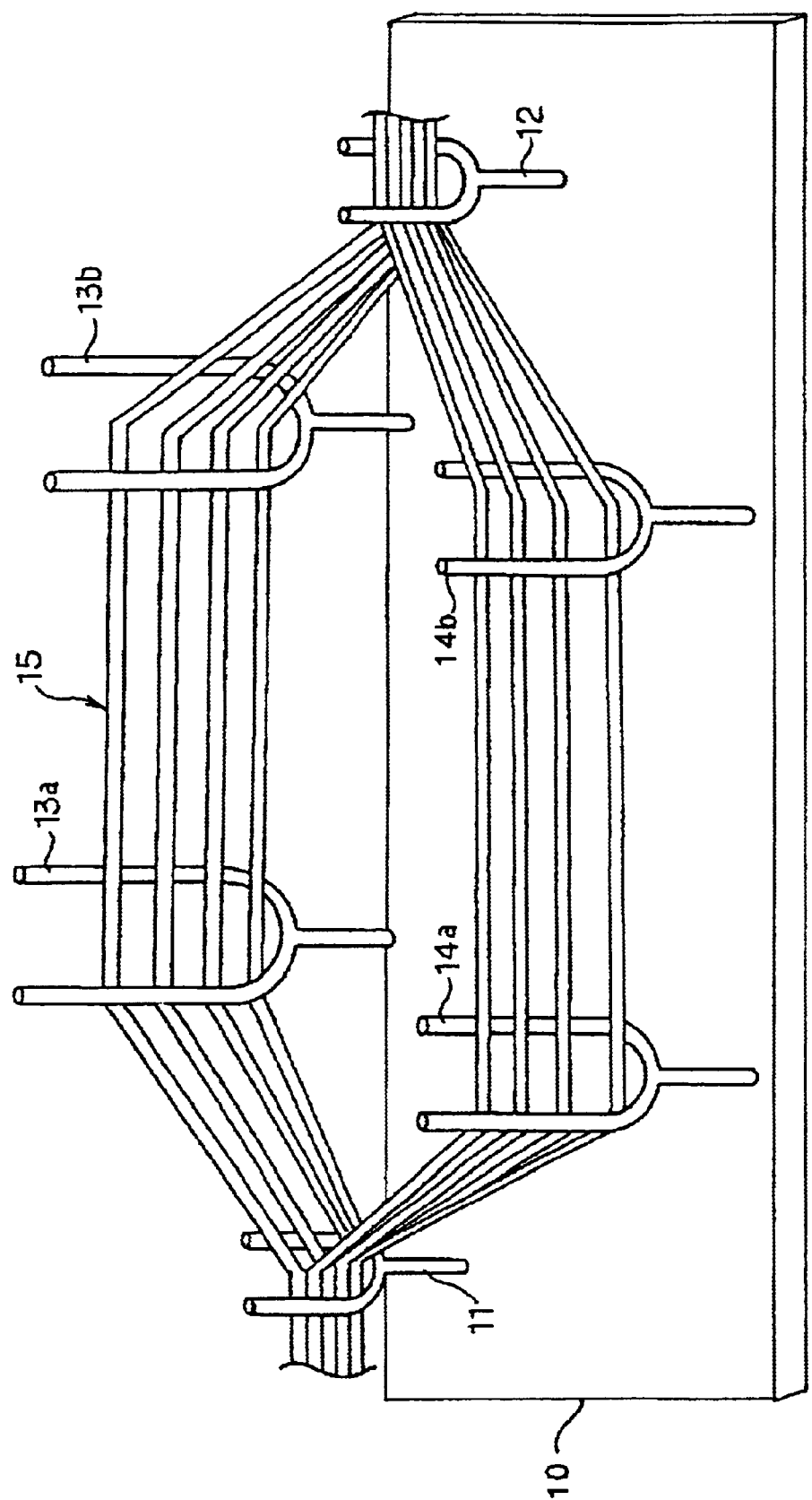
FIG. 1 is a perspective view of an embodiment of a jig for waterproofing clearances between electric wires and of a method for waterproofing clearances between electric wires in accordance with the present invention, illustrating an assembling jig for a wire harness.
Figure 4A:
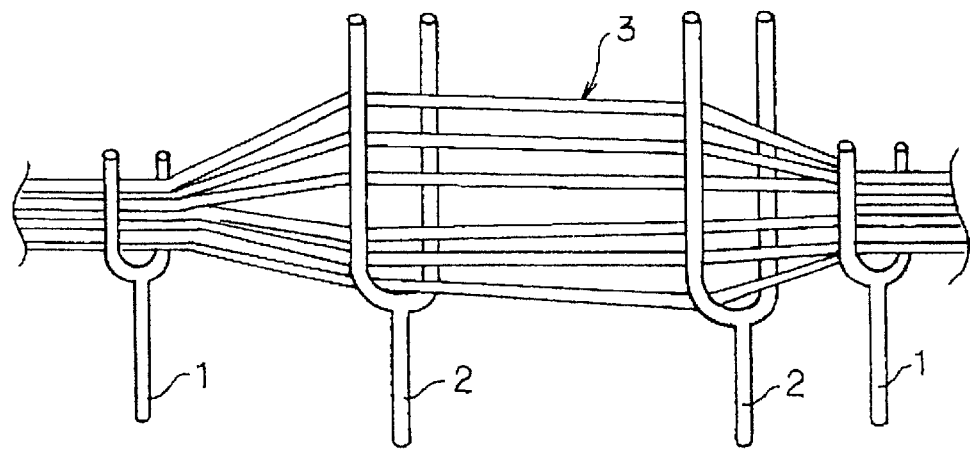
FIG. 4(a) is a perspective view of a conventional wire harness assembling jig.
Figure 4B:
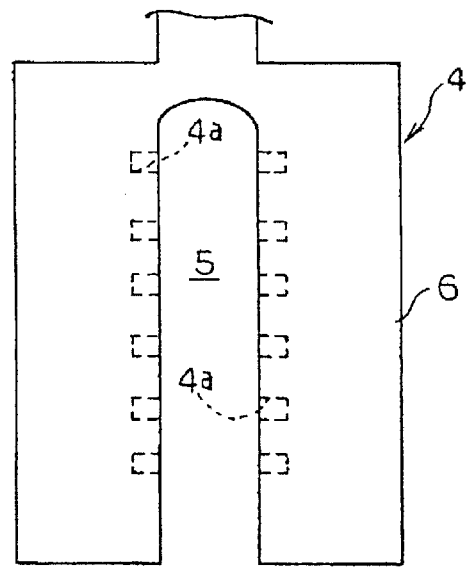
FIG. 4(b) is a front elevation view of a conventional waterproofing jig for clearances between electric wires.

FIGS. 1 to 3 show embodiments of a jig for waterproofing clearances between electric wires and of a method for waterproofing clearances between electric wires in accordance with the present invention.

First, a construction of the jig will be explained below. In FIG. 1, U-shaped jigs 11 and 12 are mounted on a wire harness assembling base or board 10 to extend upwardly. The jigs 11 and 12 are formed to have large widths so that they can hold electric wires 15 as a bundle. The electric wires 15 are divided into two branches between the U-shaped jigs 11 and 12.

Four U-shaped jigs 13a, 13b, 14a, and 14b are mounted on the wire harness assembling base or board 10 between the jigs 11 and 12. The U-shaped jigs 13a, 13b, 14a, and 14b are elongated vertically to enable arrangement of the electric wires 15 in a vertically juxtaposed manner.

A jig 16 for waterproofing clearances between the electric wires 15 includes a support body 19 including receiving chambers 17 and 18, which are disposed in the support body in parallel to one another so that each chamber contains the electric wires 15 in a juxtaposed manner. Nozzle holes 17a and 18a are provided in the support body 19 for injecting a sealant (not shown) into the receiving chambers 17 and 18. The support body 19 is connected to an adhesive-ejecting tank (not shown).

The support body 19 is provided with a shutter plate (adjusting member) 20. The shutter plate 20 is provided with openings 20b each of which has the same area as that of each of the nozzle holes 17a and 18a and is associated with each of the nozzle holes 17a and 18a. Relative displacement between the nozzle holes 17a, 18a and the openings 20b can adjust an opening area of each of the nozzle holes 17a and 18a, as shown in FIGS. 3(a) and 3(b).

The shutter plate 20 is provided on a given portion thereof with a projection 20a which extends outwardly from the support body 19. When the projection 20a is manually moved in a slit 19a formed in the support body 19, the shutter plate 20 slides on the support body 19.

In order to waterproof the clearances between the electric wires 15 by means of the waterproofing jig 16 thus constructed, after adjusting the opening areas of the nozzle holes 17a and 18a by the shutter plate 20, the jig 16 is positioned over the electric wires 15 such that the receiving chambers 17 and 18 in the support body 19 contain the electric wires 15 juxtaposed vertically between the U-shaped jigs 13a and 13b and the electric wires 15 juxtaposed vertically between the U-shaped jigs 14a and 14b. Then, the sealant is ejected from the nozzle holes 17a and 18a into the receiving chambers. Next, the electric wires 15 are bundled after they are removed from the receiving chambers 17 and 18. Thus, it is possible to fill clearances between electric wires 15 with a sealant, thereby waterproofing the clearances.

In the embodiment of the present invention, two sets (as opposed to only one set in the prior art) of juxtaposed electric wires 15 are arranged in parallel to each other and each set of the electric wires 15 is contained in each of the receiving chambers 17 and 18. The support body 19 can inject the sealant into the clearances between the sets of the juxtaposed electric wires 15. Accordingly, the support body 19 does not require a large space in a vertical direction and can fill the clearances between the electric wires 15 with the sealant within a small space and readily enhance waterproofing of the clearances between the electric wires 15.

Since the juxtaposed electric wires 15 are not arranged in a wide vertical area, it is possible to prevent the uppermost and lowermost electric wires 15 from resulting in excessive lengths, thereby eliminating a step of treating the excessive lengths of the electric wires.

The shutter plate 20 which changes the opening areas of the nozzle holes 17a and 18a can adjust the quantity of sealant to be ejected into the receiving chambers 17 and 18, thereby ejecting a quantity of a sealant suitable for the number of the electric wires 15.

Although two receiving chambers 17 and 18 are provided in the support body 19 in the above embodiments, three or more receiving chambers may be provided in the support body.

From the above description of the invention, those skilled in the art will perceive improvements, changes and modifications. Such improvements, changes and modifications within the skill of the art are intended to be covered by the appended claims.

The present disclosure relates to subject matter contained in priority Japanese Patent Application No. 2000-203458, filed on Jul. 5, 2000, which is herein incorporated by reference in its entirety.

What is claimed is:

1. A jig for waterproofing clearances between electric wires, wherein a sealant is fillable into clearances between a plurality of electric wires to waterproof the clearances between the electric wires, said jig comprising:

a support body having at least two receiving chambers, each receiving chamber being configured to receive a plurality of electric wires in a juxtaposed manner;

a plurality of nozzle holes formed in said support body for ejecting the sealant into said chambers; and an adjusting member mounted on said support body for changing an opening area of said nozzle holes.

2. The jig for waterproofing clearances between electric wires according to claim 1, wherein said adjusting member comprises at least one plate provided with holes corresponding to said nozzle holes.

3. The jig for waterproofing clearances between electric wires according to claim 2, wherein said at least one plate is slidable relative to said support body for changing the opening area of said nozzle holes.

4. The jig for waterproofing clearances between electric wires according to claim 3, further comprising an actuator for said at least one plate.

5. A system for waterproofing clearances between electric wires of a wire harness formed from a plurality of electric wires, said system comprising:

a plurality of first generally U-shaped jigs mounted on a wiring board to extend upwardly therefrom, said first jigs configured to retain first and second ends of the wire harness;

a plurality of second generally U-shaped jigs mounted on the wiring board between said first jigs, said second jigs configured to retain a portion of the electric wires of the wire harness in a vertically spaced array; and a waterproofing jig configured to be positioned over each portion of electric wires to inject a sealant into clearances between the electric wires, said waterproofing jig comprising:

a support body including at least two receiving chambers and a plurality of nozzle holes communicating with said receiving chambers, wherein each receiving chamber is configured to receive a respective portion of the electric wires; and an adjusting member mounted on said support body for changing an opening area of said nozzle holes.

6. The system according to claim 5, wherein said adjusting member comprises at least one plate provided with holes corresponding to said nozzle holes.

7. The system according to claim 6, wherein said at least one plate is slidable relative to said support body for changing the opening area of said nozzle holes.

8. The system according to claim 7, further comprising an actuator for said at least one plate.

* * * * *